United States Patent
Cho et al.

(10) Patent No.: US 12,202,333 B2
(45) Date of Patent: Jan. 21, 2025

(54) DISPLAY DEVICE FOR VEHICLE AND AUTOMOBILE INCLUDING THE SAME

(71) Applicant: SAMSUNG DISPLAY CO., LTD., Yongin-si (KR)

(72) Inventors: Eun Jeong Cho, Busan (KR); Eun Sup Kim, Suwon-si (KR); Hyang Yul Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 810 days.

(21) Appl. No.: 17/070,166

(22) Filed: Oct. 14, 2020

(65) Prior Publication Data

US 2021/0284023 A1  Sep. 16, 2021

(30) Foreign Application Priority Data

Mar. 11, 2020 (KR) .......................... 10-2020-0030156

(51) Int. Cl.
| | | |
|---|---|---|
| *B60K 35/00* | (2024.01) | |
| *B60K 35/23* | (2024.01) | |
| *B60K 35/40* | (2024.01) | |
| *B60K 35/50* | (2024.01) | |

(52) U.S. Cl.
CPC .............. *B60K 35/00* (2013.01); *B60K 35/50* (2024.01); *B60K 35/23* (2024.01); *B60K 35/415* (2024.01); *B60K 35/425* (2024.01); *B60K 2360/28* (2024.01)

(58) Field of Classification Search
None
See application file for complete search history.

(56) References Cited

U.S. PATENT DOCUMENTS

| | | |
|---|---|---|
| 7,609,339 B2 | 10/2009 | Choi |
| 7,675,668 B2 | 3/2010 | Lim |
| 9,804,311 B2 | 10/2017 | Gaides et al. |
| 10,928,660 B2 | 2/2021 | Kim et al. |
| 2020/0257144 A1* | 8/2020 | Yuuki ............... G02F 1/133524 |
| 2021/0033898 A1* | 2/2021 | Woodgate ........... G02F 1/13471 |

(Continued)

FOREIGN PATENT DOCUMENTS

| | | |
|---|---|---|
| JP | 2012-163905 | 8/2012 |
| KR | 10-2007-0090662 | 9/2007 |
| KR | 10-2008-0001522 A | 1/2008 |

(Continued)

OTHER PUBLICATIONS

Office Action dated Jul. 8, 2024 in related Korean Patent Application No. 10-2020-0030156, in Korean, 7 pages.

*Primary Examiner* — Richard H Kim
(74) *Attorney, Agent, or Firm* — F. CHAU & ASSOCIATES, LLC

(57) ABSTRACT

The present disclosure relates to a display device. The display device may be used for a vehicle and may include a display panel, a window, and a first light control layer. The display panel includes pixels arranged along a first direction and a second direction crossing the first direction. The window is disposed on the display panel. The first light control layer is disposed between the display panel and the window and including first photochromic lines. The first photochromic lines extend in the first direction and are arranged along the second direction and include a photochromic material.

19 Claims, 8 Drawing Sheets

(56) References Cited

U.S. PATENT DOCUMENTS

2022/0171221 A1\* 6/2022 Hsieh ................ G02F 1/133615

FOREIGN PATENT DOCUMENTS

| KR | 10-1167318 B1 | 7/2012 |
|----|---------------|--------|
| KR | 10-2013-0137946 | 12/2013 |
| KR | 10-2014-0041576 | 4/2014 |
| KR | 10-1830969 | 2/2018 |
| KR | 10-2018-0129345 A | 12/2018 |

\* cited by examiner

DISPLAY DEVICE FOR VEHICLE AND AUTOMOBILE INCLUDING THE SAME

CROSS-REFERENCE TO RELATED APPLICATION(S)

This application claims priority under 35 USC § 119 to Korean Patent Application No. 10-2020-0030156 filed on Mar. 11, 2020 in the Korean Intellectual Property Office (KIPO), the entire disclosure of which is incorporated by reference herein.

BACKGROUND

1. Field

Embodiments relate to a display device. More particularly, embodiments relate to a display device for a vehicle and an automobile including the display device.

2. Description of the Related Art

A display device is an electronic device that provides visual information to a user. Display devices are used in mobile phones, computers, tablets, and in automobiles. In the case of an automobile, a display device may provide navigation, entertainment, and vehicle management provide a driver with an immersive driving experience while also provide safety features such as night vision, back-up cameras, and engine warnings.

Head-up displays (HUD) are display devices located in front of a driver, providing information to the driver without taking their eyes off the road. The HUD shows the information on a display device with illuminated pixels, while the area not illuminated is transparent. However, in a nighttime scenario the illuminated pixels may be visible in a reflection on the windshield, distracting the driver. A distracted driver may increase the possibility of road accidents. Therefore, there is a need in the art to reduce a reflected image from the HUD, via the windshield, to the driver.

SUMMARY

Embodiments provide a display device for a vehicle capable of selectively controlling a viewing angle for safe driving.

A display device for a vehicle according to an embodiment may include a display panel including pixels arranged along a first direction and a second direction crossing the first direction, a window disposed on the display panel, and a first light control layer disposed between the display panel and the window and including first photochromic lines, wherein the first photochromic lines extend in the first direction, are arranged along the second direction, and include a photochromic material.

In an embodiment, the first photochromic lines may be transparent when not receiving an ultraviolet light, and the first photochromic lines may be opaque when receiving the ultraviolet light. In an embodiment, the photochromic material may be at least one of triarylmethanes, stilbenes, azastilbenes, nitrones, fulgides, spiropyrans, naphthopyrans, spiro-oxazines, and quinones.

In an embodiment, each of the first photochromic lines may have a solid line shape. In an embodiment, each of the first photochromic lines may have a dashed line shape. In an embodiment, the display device may further include a first light source disposed on a side of the first light control layer and providing an ultraviolet light to the first photochromic lines.

In an embodiment, the first light control layer may further include second photochromic lines, the second photochromic lines crossing the first photochromic lines and including the photochromic material. In an embodiment, the first photochromic lines and the second photochromic lines may be transparent when not receiving an ultraviolet light, and the first photochromic lines and the second photochromic lines may be opaque when receiving the ultraviolet light. In an embodiment, each of the first photochromic lines and the second photochromic lines may have a solid line shape.

In an embodiment, the display device may further include a first light source disposed on a first side of the first light control layer in the first direction and providing an ultraviolet light to the first photochromic lines, and a second light source disposed on a second side of the first light control layer in the second direction and providing an ultraviolet light to the second photochromic lines. In an embodiment, the display device may further include a second light control layer disposed between the display panel and the first light control layer or between the first light control layer and the window, and including second photochromic lines, the second photochromic lines crossing the first photochromic lines and including the photochromic material.

In an embodiment, the display device may further include a first light source disposed on a side of the first light control layer and providing an ultraviolet light to the first photochromic lines, and a second light source disposed on a side of the second light control layer and providing an ultraviolet light to the second photochromic lines. In an embodiment, the display device may further include a first light shield layer disposed on the window or between the first light control layer and the window, and blocking an ultraviolet light.

In an embodiment, the display device may further include a second light shield layer disposed between the display panel and the first light control layer or under the display panel, and blocking an ultraviolet light. In an embodiment, each of the pixels may include an organic light-emitting diode.

An automobile according to an embodiment may include a car body defining an internal space and a display device provided in the internal space. The display device may include a display panel including pixels arranged along a first direction and a second direction crossing the first direction, a window disposed on the display panel, and a light control layer disposed between the display panel and the window and including photochromic lines, wherein the photochromic lines extend in the first direction, are arranged along the second direction, and include a photochromic material.

In an embodiment, the automobile may further include a dashboard in the internal space, and the display device may be disposed on the dashboard. In an embodiment, the automobile may further include a head-up display in the internal space, and the display device may be included in the head-up display. In an embodiment, the automobile may further include a passenger seat in the internal space, and the display device may be disposed in front of the passenger seat. In an embodiment, the photochromic lines may be transparent when not receiving an ultraviolet light, and the photochromic lines may be opaque when receiving the ultraviolet light.

In the display device for the vehicle according to the embodiments, the first photochromic lines of the first light control layer disposed between the display panel and the window may be changeably transparent or opaque, so that the viewing angle of the image displayed from the display device may be controlled. In the automobile according to the embodiments, the viewing angle of the image displayed from the display device may be controlled, so that the image may not be viewed in the windshield, or brightness of the image may be reduced. Further, the image may not be exposed to the driver, or the driver and the passenger may view the image together.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

The present disclosure relates generally to a display device. Some embodiments relate to a display device in an automobile or vehicle, and more particularly, to a head-up display (HUD) positioned in front of a driver. Embodiments of the present disclosure eliminate or reduce a reflected image from a windshield to the driver when pixels are illuminated in a HUD.

A HUD may be positioned in front of a driver, to provide the driver with information about the vehicle, entertainment, or enhanced visual aspects. In some examples, a viewing angle of an image produced by the HUD may be narrow, brightness may be reduced, and power consumption may be increased compared to conventional displays.

Therefore, embodiments of the present disclosure provide a display device with a light control layer having photochromic lines between a display panel and a window. The photochromic lines may be transparent or opaque based on the emission of light directed at them. In some embodiments, the viewing angle may be controlled by the light. Accordingly, the brightness may be increased, power consumption may be decreased, and the image produced by the HUD may not be viewed in a reflection from the windshield.

The display device of the present disclosure may be used for a vehicle and may include a display panel, a window, and a first light control layer. The display panel includes pixels arranged along a first direction and a second direction crossing the first direction. The window is disposed on the display panel. The first light control layer is disposed between the display panel and the window and including first photochromic lines. The first photochromic lines extend in the first direction and are arranged along the second direction and include a photochromic material.

Hereinafter, display devices for vehicles and automobiles in accordance with embodiments will be explained in detail with reference to the accompanying drawings.

Figure 1:
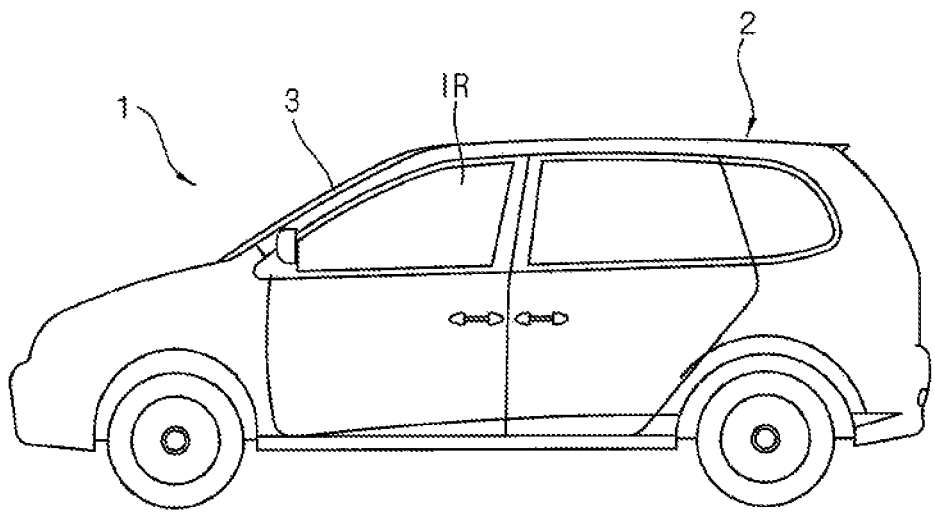
FIG. 1 is a side view illustrating an automobile according to an embodiment.
Figure 2:
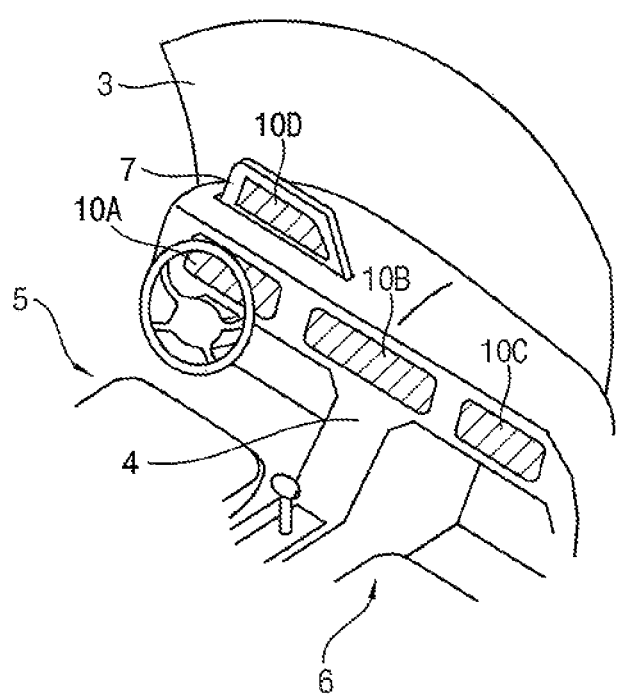
FIG. 2 is a diagram illustrating an internal space of the automobile in FIG. 1.

FIG. 1 is a side view illustrating an automobile according to an embodiment. FIG. 2 is a diagram illustrating an internal space of the automobile in FIG. 1.

Referring to FIGS. 1 and 2, an automobile 1 according to an embodiment may include a car body 2 and display devices 10A, 10B, 10C, and 10D for a vehicle. The car body 2 may form an outer edge of the automobile 1, and may define an internal space IR in which a driver and a passenger are boarded. The car body 2 may include a windshield 3 protecting the driver and the passenger from outside and providing a view for the driver. The display devices 10A, 10B, 10C, and 10D may be provided in the internal space IR.

In an embodiment, the display devices 10A, 10B, and 10C may be disposed on a dashboard 4 provided in the internal space IR. For example, the display device 10A may be disposed on the dashboard 4 in front of a driver seat 5 to provide speed, engine performance, or warning information or the like to the driver. For example, the display device 10C may be disposed on the dashboard 4 in front of a passenger seat 6 to provide entertainment or control information or the like to the passenger. For example, the display device 10B may be disposed on the center of the dashboard 4 to provide navigation information or the like.

In another embodiment, the display device 10D may be included in a head-up display 7 for a vehicle. The head-up display 7 may be disposed on the dashboard 4. For example, the display device 10D may provide information helpful for driving or the like to the driver.

A display device 10 such as display device 10A, 10B, 10C, or 10D may be configured with a photochromic pattern that can change from a transparent state to an opaque state (e.g., a state with relatively less transparency compared to the transparent state). The photochromic pattern may extend across some parts of the display device 10, but may leave gaps in portions of the pattern that do not include a photochromic pattern. In some examples, the photochromic pattern may be controlled by exposure to ultraviolet (UV) light. By controlling the transparency of the photochromic pattern, the display device 10 may be configured to prevent undesired reflections off the windshield 3, or may be configured to prevent visibility by an occupant in the driver seat 5 (i.e., for displays on the passenger side). Therefore, visual distractions for a driver may be reduced.

Figure 3:
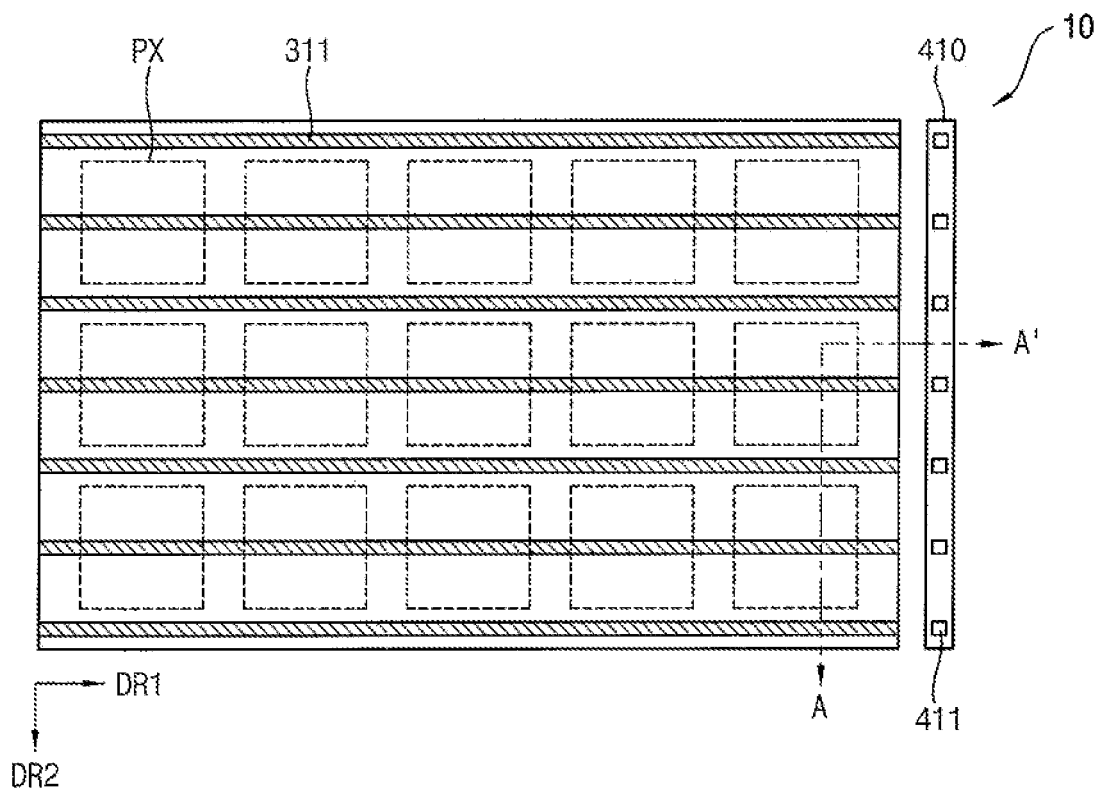
FIG. 3 is a plan view illustrating a display device for a vehicle according to an embodiment.
Figure 4:
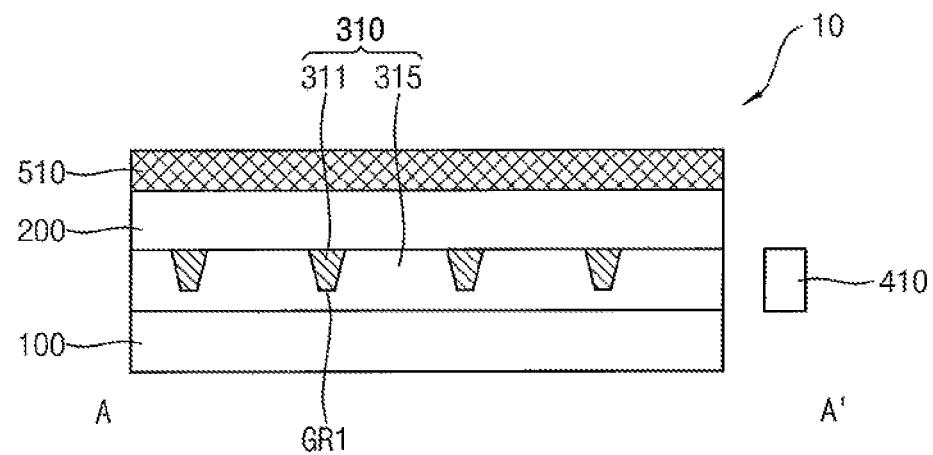
FIG. 4 is a cross-sectional view taken along a line A-A' in FIG. 3.

FIG. 3 is a plan view illustrating a display device for a vehicle according to an embodiment. FIG. 4 is a cross-sectional view taken along a line A-A' in FIG. 3.

Referring to FIGS. 3 and 4, a display device 10 for a vehicle according to an embodiment may include a display panel 100, a window 200, a first light control layer 310, a first light source 410, and a first light shield layer 510.

The display panel 100 may include a plurality of pixels PX. Each of the pixels PX may emit light, and the display panel 100 may display an image based on the light emitted from the pixels PX. In digital imaging, a pixel (or picture element) refers to the smallest addressable element in a display device, and the smallest controllable element of a picture represented on the device. In some cases, each pixel may represent a sample of an original image. The color and intensity of each pixel is variable. In color imaging systems, a color may be represented by three or four component intensities such as red, green, and blue, or cyan, magenta, yellow, and black.

The pixels PX may be arranged along a first direction DR1 and a second direction DR2 crossing the first direction DR1. For example, the first direction DR1 may be a pixel row direction, and the second direction DR2 may be a pixel column direction. In some examples, the second direction DR2 is perpendicular to the first direction DR1, and both the first direction DR1 and the second direction DR2 may be parallel to a surface of the display device 10.

Each of the pixels PX may include an organic light-emitting diode (OLED). The OLED may include a first electrode, a second electrode, and an emission layer disposed between the first electrode and the second electrode. The emission layer may emit light based on an electric field between the first electrode and the second electrode. However, the present invention is not limited thereto, and each of the pixels PX may include a quantum dot light-emitting diode (QLED) or the like.

The window 200 may be disposed on the display panel 100. The image displayed from the display panel 100 may be provided to the driver or the passenger through the window 200. The window 200 may protect the display panel 100 from outside. In some embodiments, the window 200 may be transparent and may be formed of plastic, glass, or the like.

The first light control layer 310 may be disposed between the display panel 100 and the window 200. The first light control layer 310 may control a viewing angle of the image displayed from the display panel 100.

The first light control layer 310 may include a first base 315 and a plurality of first photochromic lines 311. The first base 315 may include a transparent material such as a transparent resin. Grooves GR1 may be formed in the first base 315. In one embodiment, the first photochromic lines 311 may be formed to extend across the entire length of the display device 10. In another embodiment, the first photochromic lines 311 have a dashed configuration including breaks in the lines that do not include photochromic material. In some embodiments, some or all of the first photochromic lines 311 are aligned with rows or columns of pixels PX. For example, as illustrated in FIG. 3, every other first photochromic line 311 is aligned with a row of pixels PX, and the remaining first photochromic lines 311 are located between rows of pixels PX or at the edge of the display device 10.

The first photochromic lines 311 may be disposed in the groove GR1 of the first base 315. The first photochromic lines 311 may include photochromic material that may change between a transparent state or an opaque state (e.g., a state that allows less light through the first photochromic lines 311 compared to the transparent state). For example, the grooves GR1 may be formed in the first base 315 using a mold or the like. The grooves GR1 may be filled with the photochromic material to form the first photochromic lines 311.

A photochromic material refers to a material that changes in the presence of light. For example, a photochromic lens may darken on exposure to high frequency light such as ultraviolet (UV) radiation. In the absence of activating light, the material may return to a clear state. Photochromic lenses may be made of glass, polycarbonate, or another plastic. In some examples, molecules embedded in a transparent material result in photochromic property. In an embodiment, the photochromic material may be at least one of triarylmethanes, stilbenes, azastilbenes, nitrones, fulgides, spiropyrans, naphthopyrans, spiro-oxazines, and quinones.

The first photochromic lines 311 may extend in the first direction DR1 and may be arranged along the second direction DR2. For example, the first photochromic lines 311 may extend in the pixel row direction and may be arranged along the pixel column direction.

The first photochromic lines 311 may be changeably transparent or opaque since the first photochromic lines 311 include the photochromic material. In an embodiment, the first photochromic lines 311 may be transparent when receiving ultraviolet light, and the first photochromic lines 311 may be opaque when not receiving the ultraviolet light.

When the first photochromic lines 311 are transparent, due to the first light control layer 310, a viewing angle of an image displayed from the display device 10 may not be narrow, and the brightness of the image may not decrease. When the first photochromic lines 311 are opaque, due to the first light control layer 310, the viewing angle of the image displayed from the display device 10 may become narrow in the second direction DR2.

In an embodiment, each of the first photochromic lines 311 may have a solid line shape. For example, each of the first photochromic lines 311 may be formed commonly in pixels PX arranged along the first direction DR1.

The first light source 410 may be disposed on a side of the first light control layer 310. For example, the first light source 410 may be disposed on a side of the first light control layer 310 in the first direction DR1. The first light source 410 may provide ultraviolet light to the first photochromic lines 311. For example, the first light source 410 may include ultraviolet lamps 411 disposed to respectively correspond to the first photochromic lines 311 and emitting the ultraviolet light in the first direction DR1. The first photochromic lines 311 may be transparent or opaque based on the ultraviolet light provided from the first light source 410.

The first light shield layer 510 may be disposed on the window 200 or between the first light control layer 310 and the window 200. FIG. 4 illustrates that the first light shield layer 510 is disposed on the window 200. However, the first light shield layer 510 may be disposed between the first light control layer 310 and the window 200.

The first light shield layer 510 may block ultraviolet light incident onto the display device 10 from outside. For example, the first light shield layer 510 may block ultraviolet light incident onto an upper portion of the first light control layer 310. The first photochromic lines 311 may not be transparent or opaque by the ultraviolet light incident from the outside when the first light shield layer 510 blocks the ultraviolet light incident from the outside.

Figure 5:
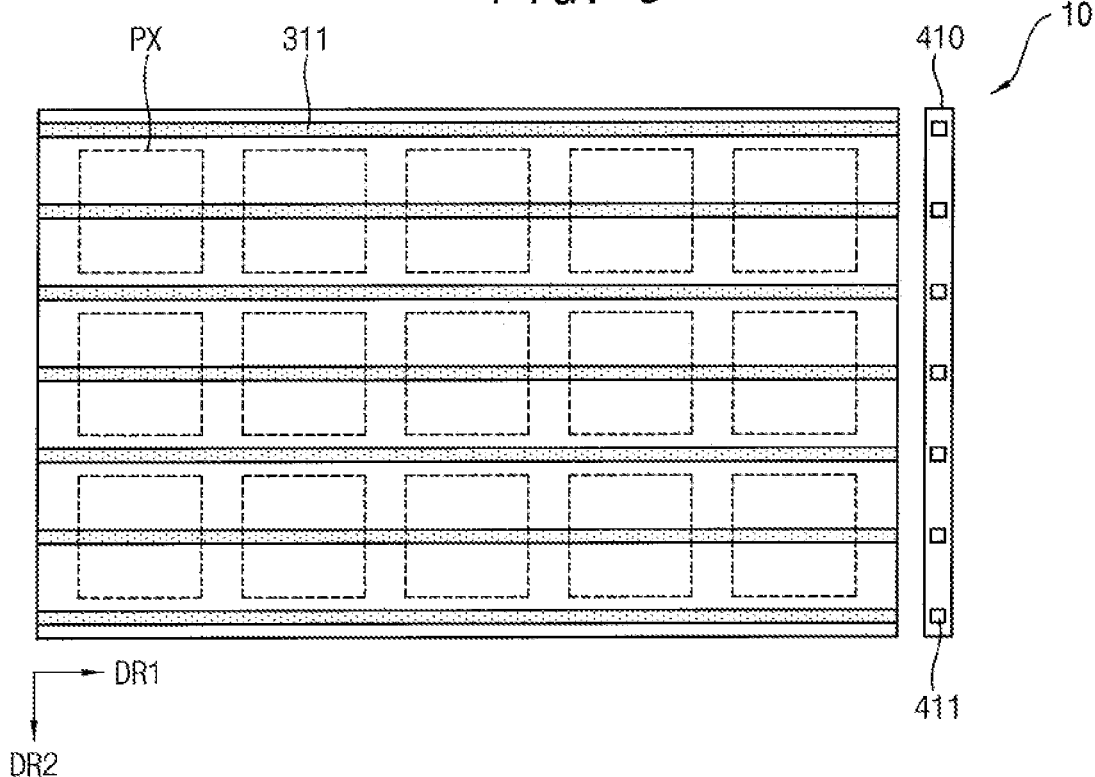
FIGS. 5 and 6 are diagrams illustrating a driving of the display device in FIG. 3.
Figure 6:
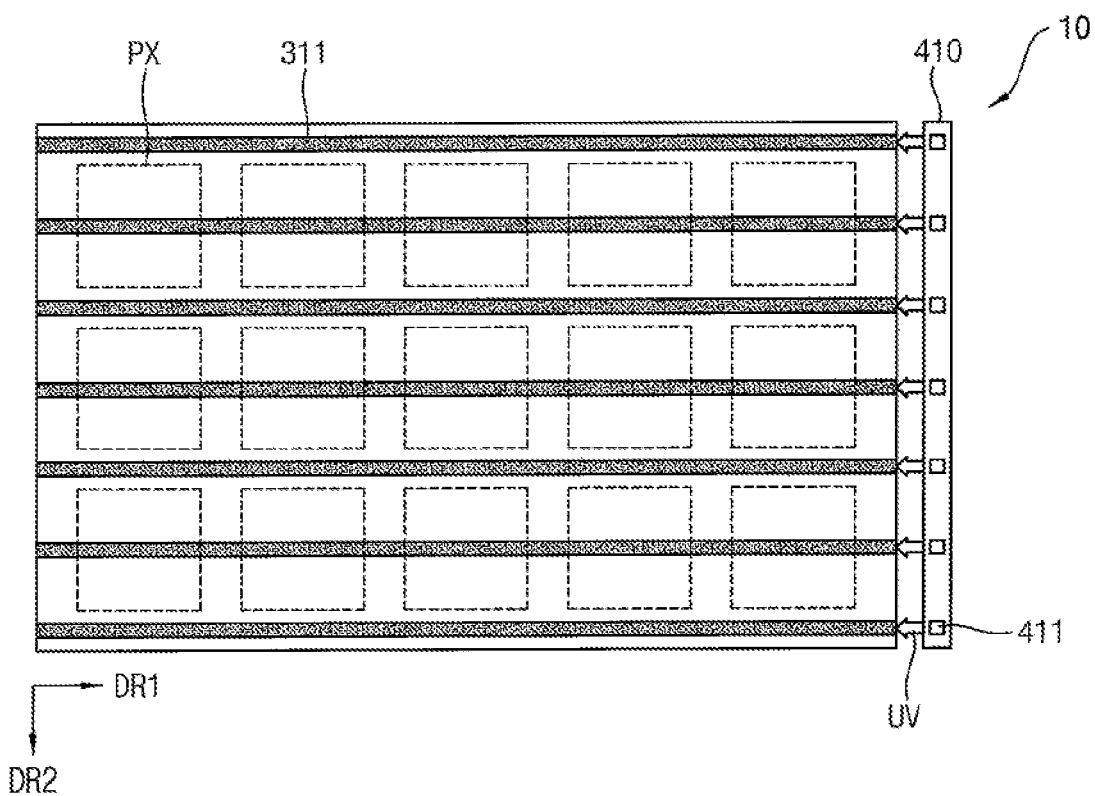

FIGS. 5 and 6 are diagrams illustrating a driving of the display device 10 in FIG. 3.

Referring to FIGS. 2, 5, and 6, emission of ultraviolet light from the first light source 410 may be controlled such that the first photochromic lines 311 may become transparent or opaque. The first photochromic lines 311 may become transparent when the first light source 410 does not provide the ultraviolet light to the first photochromic lines 311. Additionally or alternatively, the first photochromic lines 311 may become opaque when the first light source 410 provides the ultraviolet light UV to the first photochromic lines 311. For example, the ultraviolet lamps 411 included in the first light source 410 may respectively provide the ultraviolet light UV to the first photochromic lines 311.

In an embodiment, when the first direction DR1 is a horizontal direction and the second direction DR2 is a vertical direction, during the daytime, in which an image is not reflected by the windshield 3, the first light source 410 may not provide ultraviolet light to the first photochromic lines 311 as illustrated in FIG. 5 such that the first photochromic lines 311 may become transparent. Therefore, the display device 10A, 10B, 10C, and 10D may display an image with relatively high brightness. Accordingly, the power consumption of the display device 10A, 10B, 10C, and 10D may be reduced, and the lifespan of the display device 10A, 10B, 10C, and 10D may increase. Further, during the nighttime, in which the image is reflected by the windshield 3, the first light source 410 may provide the ultraviolet light UV to the first photochromic lines 311, as illustrated in FIG. 6, such that the first photochromic lines 311 may become opaque. Therefore, the display device 10A, 10B, 10C, and 10D may display an image with a relatively narrow viewing angle, and the image may not be reflected by the windshield 3. Accordingly, the image provided from the display device 10A, 10B, 10C, and 10D and viewed in the windshield 3 may not disturb the driving of the driver.

In another embodiment, when the first direction DR1 is the vertical direction, the second direction DR2 is the horizontal direction, and the driver is not driving the automobile, the first light source 410 may not provide ultraviolet light to the first photochromic lines 311 as illustrated in FIG. 5 such that the first photochromic lines 311 may become transparent, therefore, the display device 10A, 10B, 10C, and 10D may display an image with a relatively wide viewing angle in the horizontal direction, and the driver and the passenger may view the image together. Further, when the driver drives the automobile, the first light source 410 may provide the ultraviolet light UV to the first photochromic lines 311, as illustrated in FIG. 6, such that the first photochromic lines 311 may become opaque.

In some embodiments, the display device 10A, 10B, 10C, and 10D may display an image with a relatively narrow viewing angle in the horizontal direction. Thus, the image may be viewable by one passenger, but not to another passenger, For example, the display device 10 may be configured to display an image that is visible to a user located in the passenger seat 6, but not to a user located in the driver seat 5. Thus, the driver may not view the image provided in front of the passenger seat 6. Accordingly, the image may not disturb the driving of the driver.

Figure 7:
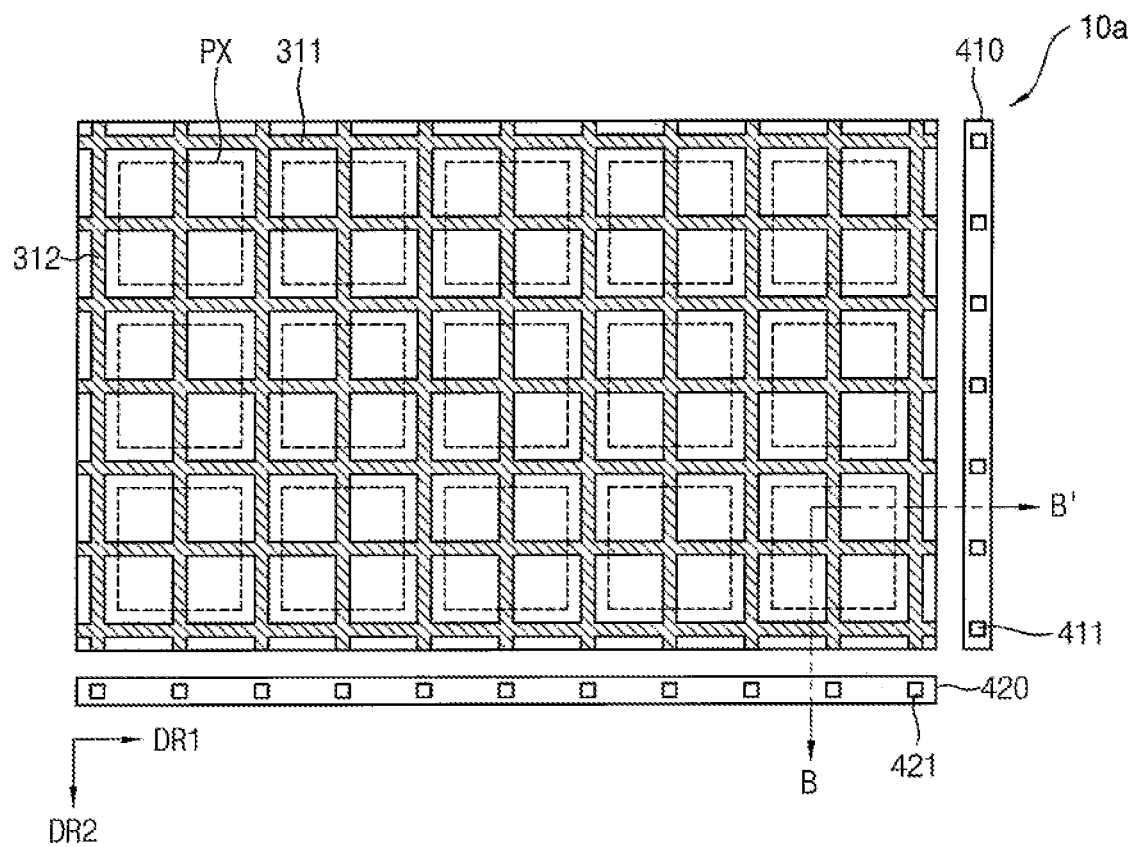
FIG. 7 is a plan view illustrating a display device for a vehicle according to an embodiment.
Figure 8:
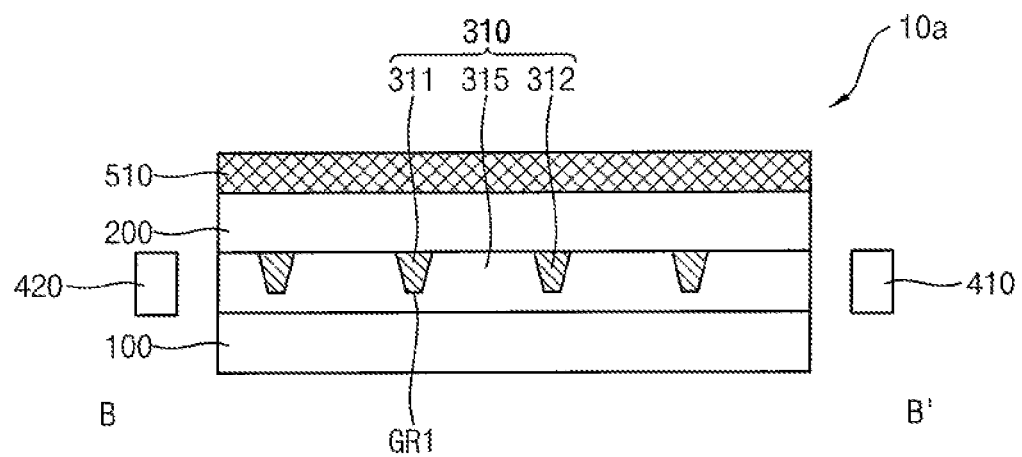
FIG. 8 is a cross-sectional view taken along a line B-B' in FIG. 7.

FIG. 7 is a plan view illustrating a display device for a vehicle according to an embodiment. FIG. 8 is a cross-sectional view taken along a line B-B' in FIG. 7.

Referring to FIGS. 7 and 8, a display device 10a for a vehicle according to an embodiment may include a display panel 100, a window 200, a first light control layer 310, a first light source 410, a second light source 420, and a first light shield layer 510. The display device 10a described with reference to FIGS. 7 and 8 may be substantially the same as or similar to the display device 10 described with reference to FIGS. 3 and 4 except for the addition of second photochromic lines 312 and the second light source 420. Accordingly, descriptions about elements of the display device 10a described with reference to FIGS. 7 and 8, which are substantially the same as or similar to the display device 10 described with reference to FIGS. 3 and 4, will not be repeated.

The first light control layer 310 may include the first base 315, the first photochromic lines 311, and the second photochromic lines 312. The first photochromic lines 311 and the second photochromic lines 312 may be disposed in the groove GR1 of the first base 315. The second photochromic lines 312 may include photochromic material that may change between a transparent state and an opaque state. For example, the grooves GR1 may be formed in the first base 315 using a mold or the like. The grooves GR1 may be filled with the photochromic material to form the first photochromic lines 311 and the second photochromic lines 312.

The second photochromic lines 312 may cross the first photochromic lines 311. In other words, the second photochromic lines 312 may extend in the second direction DR2 and may be arranged along the first direction DR1. For example, the second photochromic lines 312 may extend in the pixel column direction and may be arranged along the pixel row direction.

The second photochromic lines 312 may be changeably transparent or opaque since the second photochromic lines 312 include the photochromic material. In an embodiment, the second photochromic lines 312 may be transparent when receiving ultraviolet light, and the second photochromic lines 312 may be opaque when not receiving the ultraviolet light.

When the second photochromic lines 312 are transparent, due to the first light control layer 310, a viewing angle of an image displayed from the display device 10A may not be narrow, and the brightness of the image may not decrease. When the second photochromic lines 312 are opaque, due to the first light control layer 310, the viewing angle of the image displayed from the display device 10A may become narrow in the first direction DR1.

In an embodiment, each of the second photochromic lines 312 may have a solid line shape. For example, each of the second photochromic lines 312 may be formed commonly in pixels PX arranged along the second direction DR2.

The second light source 420 may be disposed on a side of the first light control layer 310. For example, the second light source 420 may be disposed on a side of the first light control layer 310 in the second direction DR2. The second light source 420 may provide ultraviolet light to the second photochromic lines 312. For example, the second light source 420 may include ultraviolet lamps 421 disposed to respectively correspond to the second photochromic lines 312 and emitting the ultraviolet light in the second direction DR2. The second photochromic lines 312 may be transparent or opaque based on the ultraviolet light provided from the second light source 420. The first photochromic lines 311 and the second photochromic lines 312 may be independently transparent or opaque to each other when the first light source 410 is disposed on the side of the first light control layer 310 in the first direction DR1, when the ultraviolet lamps 411 respectively provide the ultraviolet light in the first direction DR1 to the first photochromic lines 311, and when the second light source 420 is disposed on the side of the first light control layer 310 in the second direction DR2 and the ultraviolet lamps 421 respectively provide the ultraviolet light in the second direction DR2 to the second photochromic lines 312.

FIGS. 9, 10, 11, and 12 are diagrams illustrating a driving of the display device 10a in FIG. 7.

Referring to FIGS. 2, 9, 10, 11, and 12, emission of ultraviolet light of the first light source 410 may be controlled such that the first photochromic lines 311 may become transparent or opaque, and emission of ultraviolet light of the second light source 420 may be controlled such that the second photochromic lines 312 may become transparent or opaque. The first photochromic lines 311 may become transparent when the first light source 410 does not provide ultraviolet light to the first photochromic lines 311, and the first photochromic lines 311 may become opaque when the first light source 410 provides the ultraviolet light UV to the first photochromic lines 311. For example, the ultraviolet lamps 411 included in the first light source 410 may respectively provide the ultraviolet light UV to the first photochromic lines 311. The second photochromic lines 312 may become transparent when the second light source 420 does not provide ultraviolet light to the second photochromic lines 312. The second photochromic lines 312 may become opaque when the second light source 420 provides the ultraviolet light UV to the second photochromic lines 312. For example, the ultraviolet lamps 421 included in the second light source 420 may respectively provide the ultraviolet light UV to the second photochromic lines 312. Hereinafter, the first direction DR1 is assumed to be in a horizontal direction and the second direction DR2 is assumed to be in a vertical direction.

Figure 9:
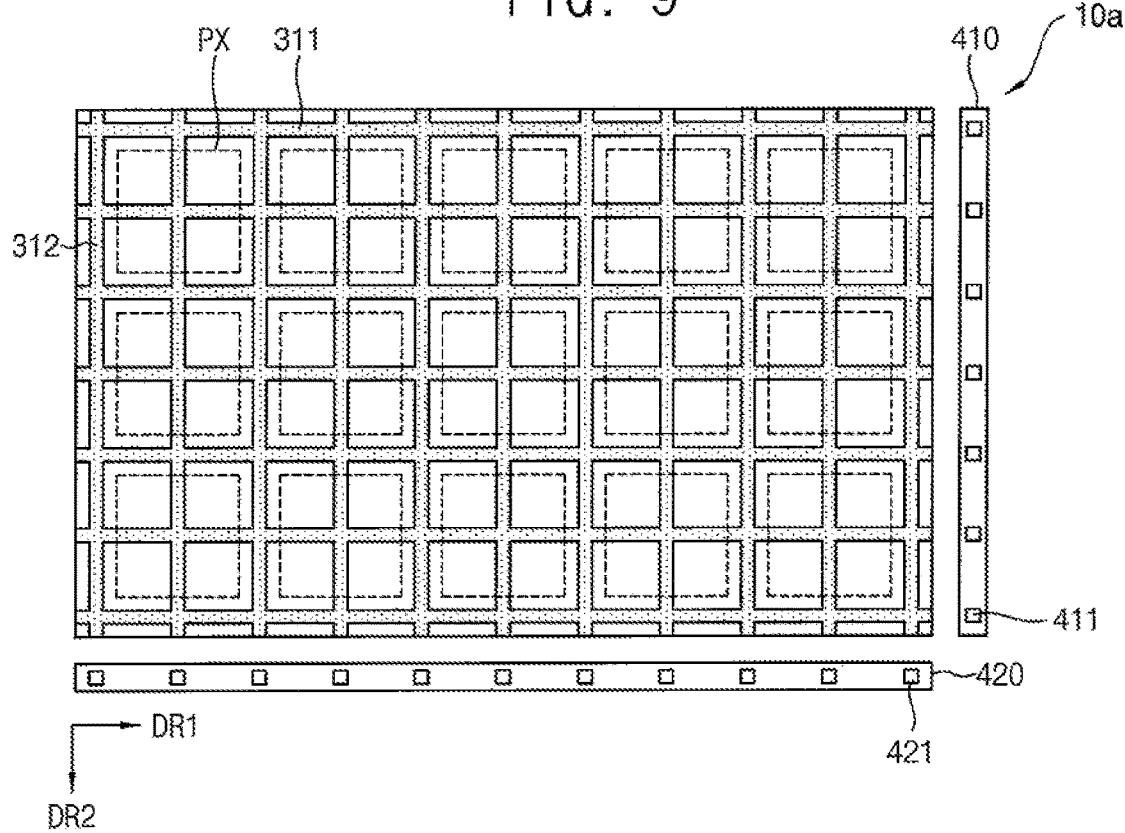
FIGS. 9, 10, 11, and 12 are diagrams illustrating a driving of the display device in FIG. 7.
Figure 10:
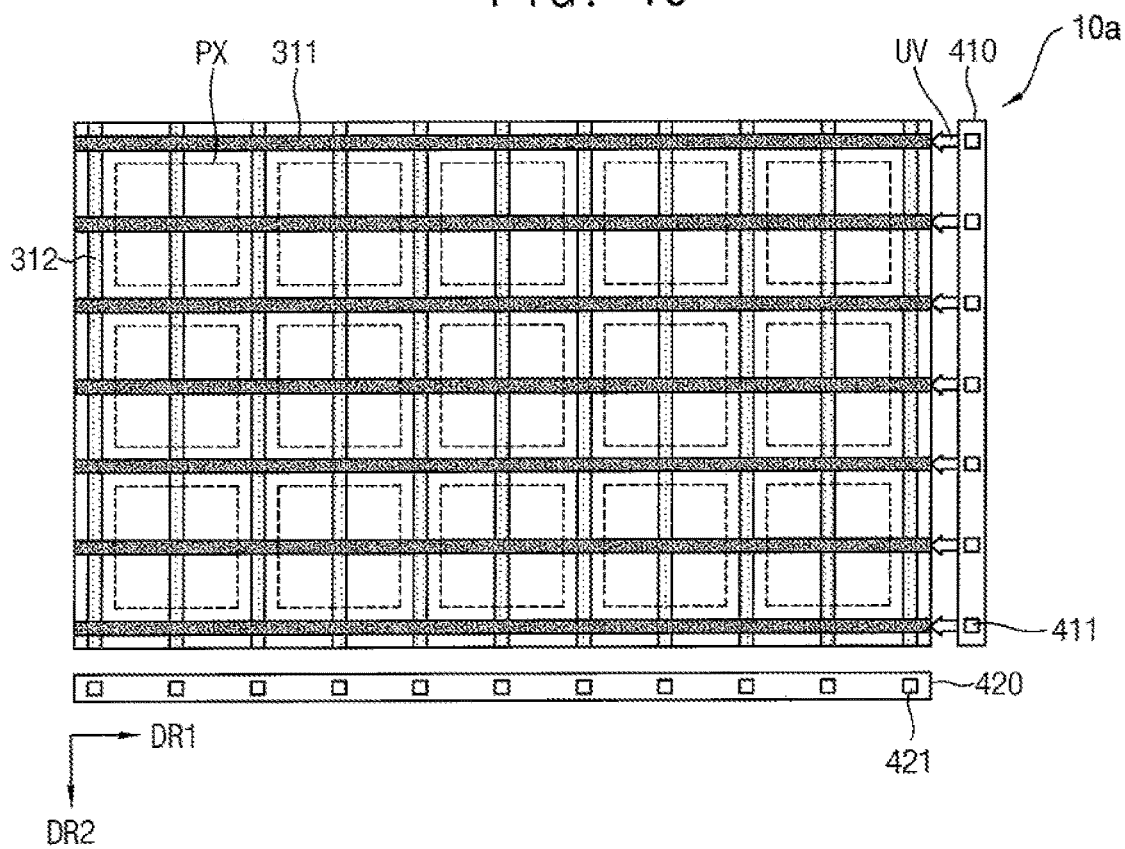
Figure 12:
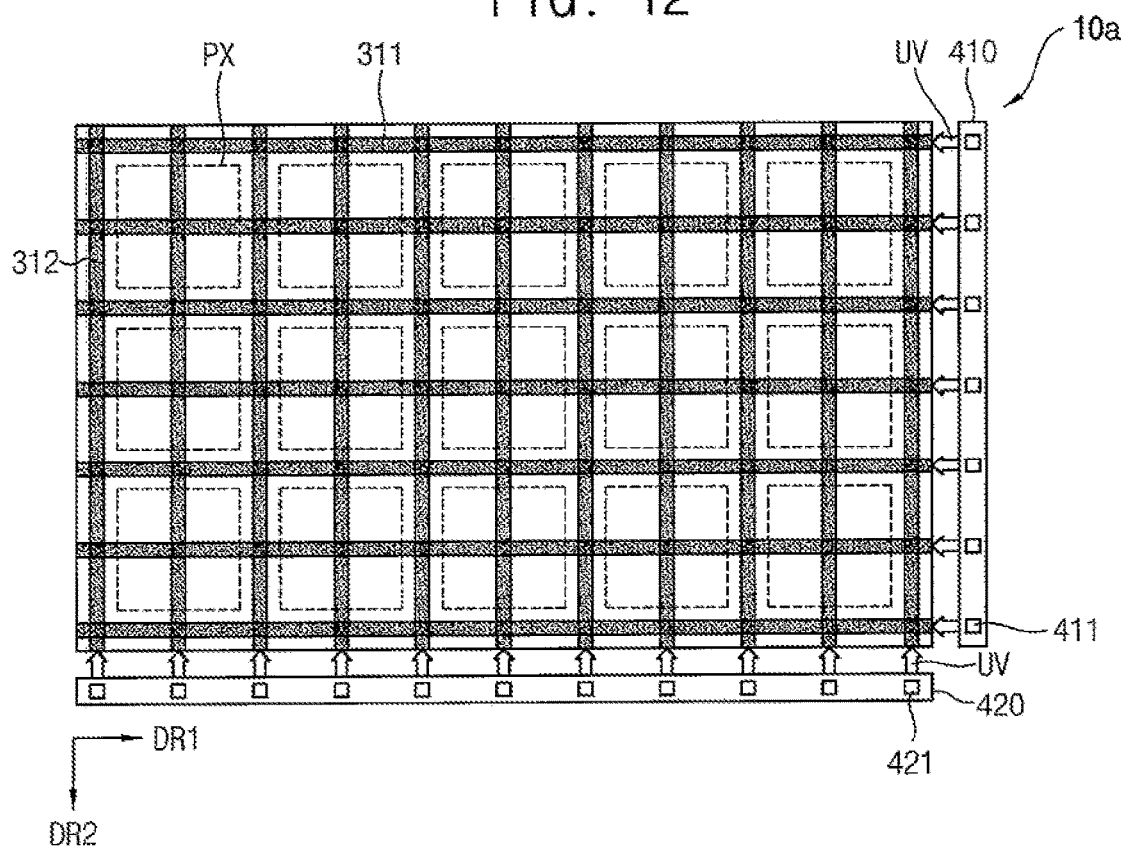

During the daytime in which an image may not be reflected by the windshield 3, the first light source 410 and the second light source 420 may not provide ultraviolet light to the first photochromic lines 311 and the second photochromic lines 312, respectively, as illustrated in FIG. 9 such that the first photochromic lines 311 and the second photochromic lines 312 may become transparent. Therefore, the display device 10A, 10B, 10C, and 10D may display an image with relatively high brightness. Accordingly, the power consumption of the display device 10A, 10B, 10C, and 10D may be reduced, and the lifespan of the display device 10A, 10B, 10C, and 10D may increase. Further, during the nighttime in which the image is reflected by the windshield 3, the first light source 410 may provide the ultraviolet light UV to the first photochromic lines 311, as illustrated in FIG. 10 or 12, such that the first photochromic lines 311 may become opaque. Therefore, the display device 10A, 10B, 10C, and 10D may display an image with a relatively narrow viewing angle in the vertical direction, and the image may not be reflected by the windshield 3. Accordingly, the image provided from the display device 10A, 10B, 10C, and 10D and viewed in the windshield 3 may not disturb the driving of the driver.

Figure 11:
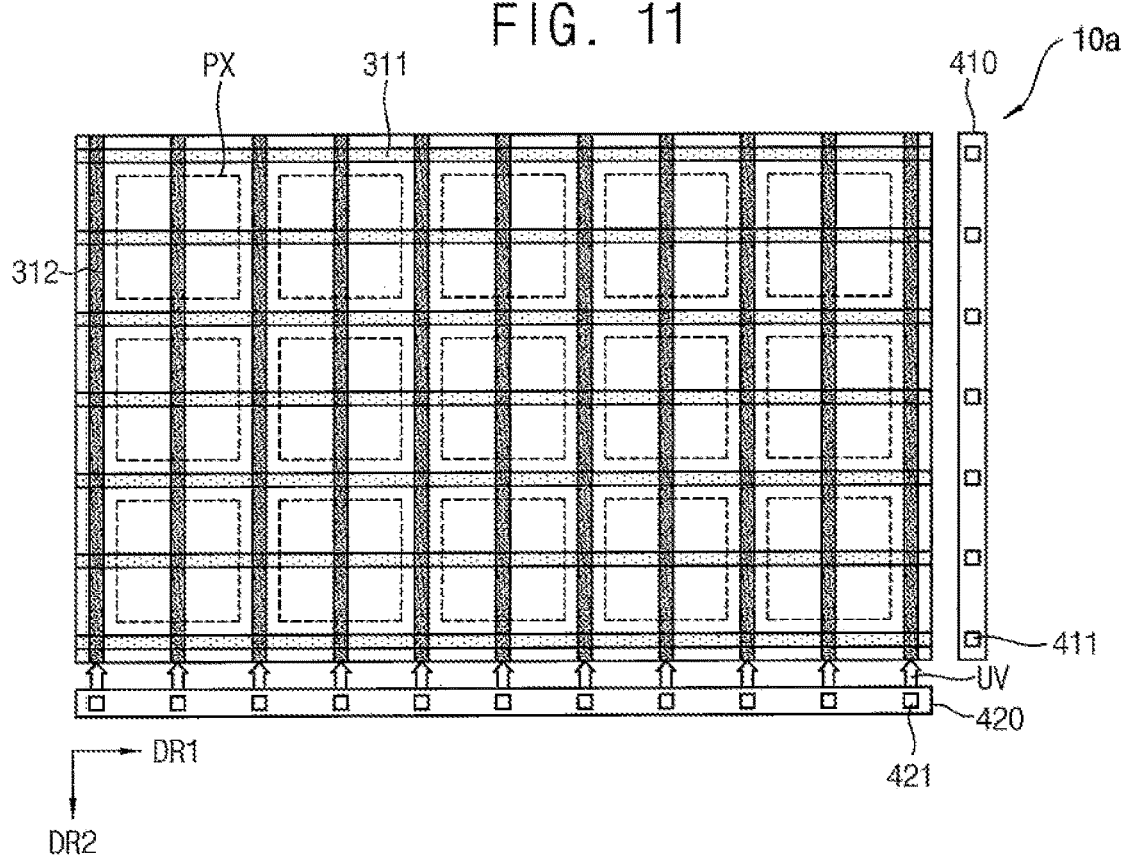

When the driver is not driving the automobile, the second light source 420 may not provide the ultraviolet light to the second photochromic lines 312 as illustrated in FIG. 9 or 10 such that the second photochromic lines 312 may become transparent, therefore, the display device 10A, 10B, 10C, and 10D may display an image with a relatively wide viewing angle in the horizontal direction, and the driver and the passenger may view the image together. Further, when the driver drives the automobile, the second light source 420 may provide the ultraviolet light UV to the second photochromic lines 312 as illustrated in FIG. 11 or 12 such that the second photochromic lines 312 may become opaque, therefore, the display device 10A, 10B, 10C, and 10D may display an image with a relatively narrow viewing angle in the horizontal direction, and the driver may not view the image provided from the display device 10C disposed in front of the passenger seat 6. Accordingly, the image provided from the display device 10C may not disturb the driving of the driver.

Figure 13:
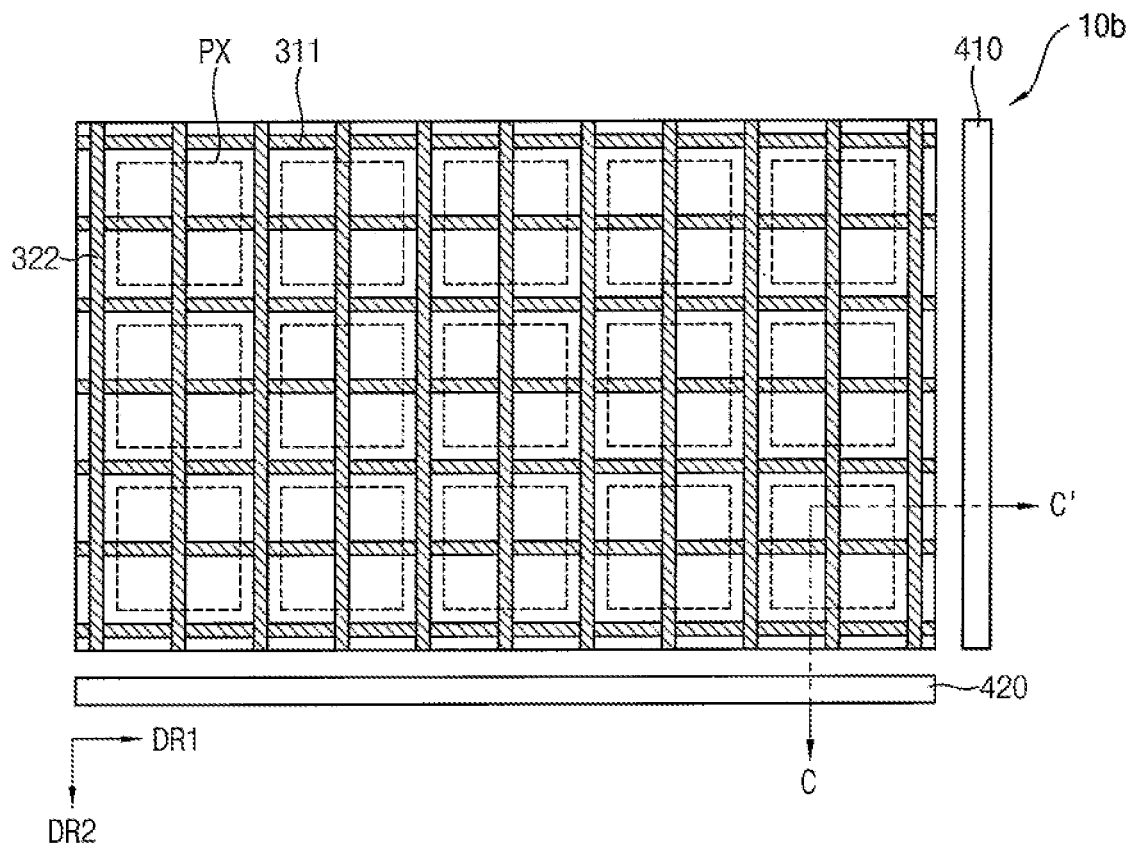
FIG. 13 is a plan view illustrating a display device for a vehicle according to an embodiment.
Figure 14:
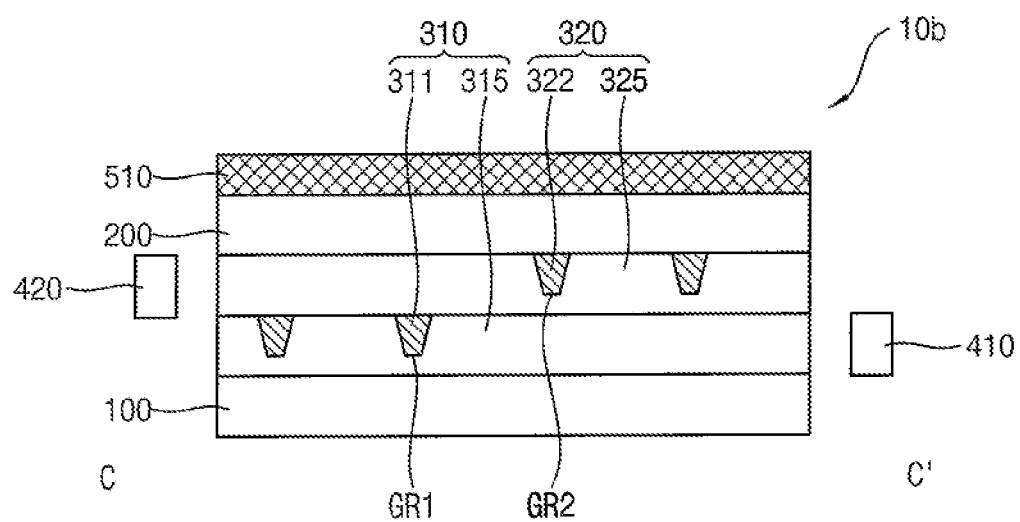
FIG. 14 is a cross-sectional view taken along a line C-C' in FIG. 13.

FIG. 13 is a plan view illustrating a display device for a vehicle according to an embodiment. FIG. 14 is a cross-sectional view taken along a line C-C' in FIG. 13.

Referring to FIGS. 13 and 14, a display device 10b for a vehicle according to an embodiment may include a display panel 100, a window 200, a first light control layer 310, a second light control layer 320, a first light source 410, a second light source 420, and a first light shield layer 510.

The display device 10b described with reference to FIGS. 13 and 14 may be substantially the same as or similar to the display device 10 described with reference to FIGS. 3 and 4 except for the addition of the second light control layer 320 and the second light source 420. Accordingly, descriptions on elements of the display device 10b described with reference to FIGS. 13 and 14, which are substantially the same as or similar to the display device 10 described with reference to FIGS. 3 and 4, will not be repeated.

The second light control layer 320 may be disposed between the display panel 100 and the first light control layer 310 or between the first light control layer 310 and the window 200. FIG. 14 illustrates that the second light control layer 320 is disposed between the first light control layer 310 and the window 200. However, the second light control layer 320 may be disposed between the display panel 100 and the first light control layer 310. The second light control layer 320 may control a viewing angle of the image displayed from the display panel 100.

The second light control layer 320 may include a second base 325 and second photochromic lines 322. The second base 325 may include transparent resin. Grooves GR2 may be formed in the second base 325.

The second photochromic lines 322 may be disposed in the groove GR2 of the second base 325. The second photochromic lines 322 may include photochromic material changeably with a transparent state and an opaque state. For example, the grooves GR2 may be formed in the second base 325 using a mold or the like, and the grooves GR2 may be filled with the photochromic material to form the second photochromic lines 322.

The second photochromic lines 322 may extend in the second direction DR2, and may be arranged along the first direction DR1. For example, the second photochromic lines 322 may extend in the pixel column direction and may be arranged along the pixel row direction.

The second photochromic lines 322 may be changeably transparent or opaque since the second photochromic lines 322 include the photochromic material. In an embodiment, the second photochromic lines 322 may be transparent when receiving ultraviolet light, and the second photochromic lines 322 may be opaque when not receiving the ultraviolet light.

When the second photochromic lines 322 are transparent, due to the second light control layer 320, a viewing angle of an image displayed from the display device 10b may not be narrow, and the brightness of the image may not decrease. When the second photochromic lines 322 are opaque, due to the second light control layer 320, the viewing angle of the image displayed from the display device 10b may become narrow in the first direction DR1.

In an embodiment, each of the second photochromic lines 322 may have a solid line shape. For example, each of the second photochromic lines 322 may be formed commonly in pixels PX arranged along the second direction DR2.

The second light source 420 may be disposed on a side of the second light control layer 320. For example, the second light source 420 may be disposed on a side of the second light control layer 320 in the second direction DR2. The second light source 420 may provide ultraviolet light to the second photochromic lines 322. For example, the second light source 420 may include ultraviolet lamps disposed to respectively correspond to the second photochromic lines 322 and emitting ultraviolet light in the second direction DR2. The second photochromic lines 322 may be transparent or opaque based on the ultraviolet light provided from the second light source 420. Since the first light source 410 providing the ultraviolet light the first photochromic lines 311 and the second light source 420 providing the ultraviolet light the second photochromic lines 322 are disposed in different layers from each other, the first photochromic lines 311 and the second photochromic lines 322 may be independently transparent or opaque to each other.

Figure 15:
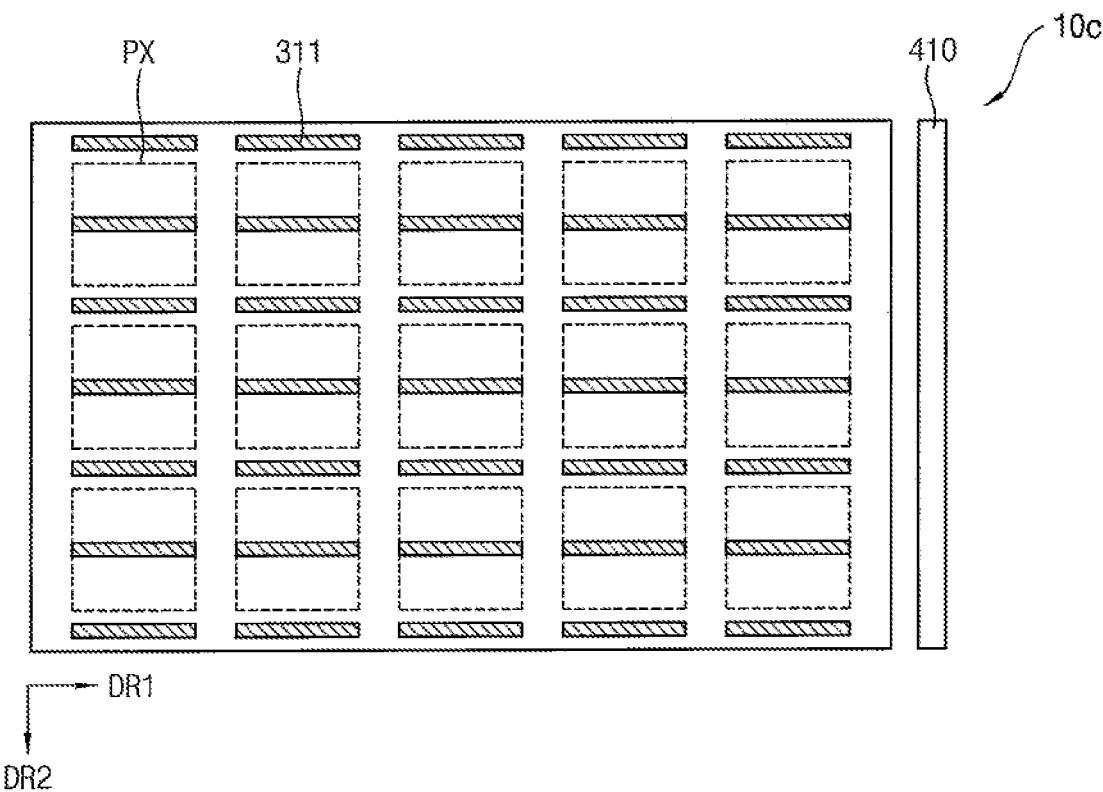
FIG. 15 is a plan view illustrating a display device for a vehicle according to an embodiment.

FIG. 15 is a plan view illustrating a display device for a vehicle according to an embodiment. The display device 10c described with reference to FIG. 15 may be substantially the same as or similar to the display device 10 described with reference to FIG. 3 except for the shapes of the first photochromic lines 311. Accordingly, descriptions on elements of the display device 10c described with reference to FIG. 15, which are substantially the same as or similar to the display device 10 described with reference to FIG. 3, will not be repeated.

Referring to FIG. 15, in an embodiment, each of the first photochromic lines 311 may have a dashed line shape. For example, each of the first photochromic lines 311 may include portions arranged along the first direction DR1 and spaced apart from each other, and the portions may be disposed to respectively correspond to pixels PX arranged along the first direction DR1.

Compared to the case where each of the first photochromic lines 311 has the solid line shape, when each of the first photochromic lines 311 has the dashed line shape, the planar area of the first photochromic lines 311 may decrease. Accordingly, when the first photochromic lines 311 are opaque, the degree of blocking of light emitted from the pixels PX by the first photochromic lines 311 may be reduced, and the display device 10c may display an image with relatively high brightness. Therefore, the power consumption of the display device 10c may be reduced, and the lifespan of the display device 10c may increase.

Figure 16:
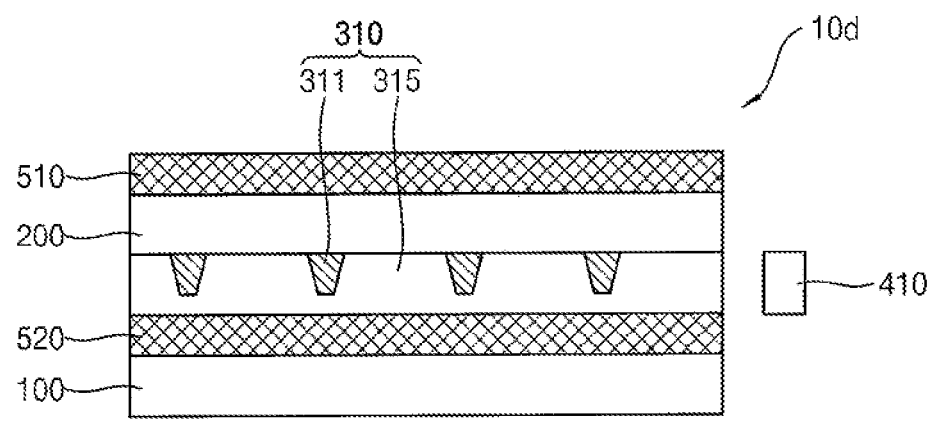
FIG. 16 is a cross-sectional view illustrating a display device for a vehicle according to an embodiment.

FIG. 16 is a cross-sectional view illustrating a display device for a vehicle according to an embodiment.

Referring to FIG. 16, a display device 10d for a vehicle according to an embodiment may include a display panel 100, a window 200, a first light control layer 310, a first light source 410, a first light shield layer 510, and a second light shield layer 520. The display device 10d described with reference to FIG. 16 may be substantially the same as or similar to the display device 10 described with reference to FIG. 4 except for the addition of the second light shield layer 520. Accordingly, descriptions on elements of the display device 10d described with reference to FIG. 16, which are substantially the same as or similar to the display device 10 described with reference to FIG. 4, will not be repeated.

The second light shield layer 520 may be disposed between the display panel 100 and the first light control layer 310 or under the display panel 100. FIG. 16 illustrates that the second light shield layer 520 is disposed between the display panel 100 and the first light control layer 310. However, the second light shield layer 520 may be disposed under the display panel 100.

The second light shield layer 520 may block ultraviolet light incident onto the display device 10d from outside. For example, the second light shield layer 520 may block ultraviolet light incident onto a lower portion of the first light control layer 310. Since the second light shield layer 520 blocks the ultraviolet light incident from the outside, the first photochromic lines 311 may not be transparent or opaque by the ultraviolet light incident from the outside.

The display device for the vehicle, according to the embodiments, may be applied to a display device included in a train, a ship, an airplane, or the like as well as the automobile.

Although the display devices for the vehicles and the automobiles including the same according to the embodiments have been described with reference to the drawings, the illustrated embodiments are examples and may be modified and changed by a person with ordinary knowledge in the relevant technical field without departing from the technical spirit described in the following claims.

What is claimed is:

1. A display device, comprising:
   a display panel including pixels arranged along a first direction and a second direction crossing the first direction;
   a window disposed on the display panel;
   a first light control layer disposed between the display panel and the window and including first photochromic lines; and
   a first light source disposed at a same vertical level and on a side of the first light control layer and providing an ultraviolet light to the first photochromic lines,
   wherein the first photochromic lines extend in the first direction, are arranged along and separated from each other in the second direction, and include a photochromic material,
   wherein the first light control layer includes a transparent base with a plurality of grooves that extend from a top surface of the first light control layer to a level above a bottom surface of the transparent base, wherein each of the first photochromic lines is disposed within a corresponding groove of the plurality of grooves, respectively.

2. The display device of claim 1, wherein the first photochromic lines are transparent when not receiving an ultraviolet light, and
   wherein the first photochromic lines are opaque when receiving the ultraviolet light.

3. The display device of claim 1, wherein the photochromic material includes at least one of triarylmethanes, stilbenes, azastilbenes, nitrones, fulgides, spiropyrans, naphthopyrans, spiro-oxazines, and quinones.

4. The display device of claim 1, wherein each of the first photochromic lines has a solid line shape.

5. The display device of claim 1, wherein the first light control layer further includes second photochromic lines, wherein the second photochromic lines extend in the second direction, cross the first photochromic lines, and include the photochromic material, and
   wherein the first light source is disposed on a first side of the first light control layer in the first direction.

6. The display device of claim 5, wherein the first photochromic lines and the second photochromic lines are transparent when not receiving an ultraviolet light, and
   wherein the first photochromic lines and the second photochromic lines are opaque when receiving the ultraviolet light.

7. The display device of claim 5, wherein each of the first photochromic lines and the second photochromic lines has a solid line shape.

8. The display device of claim 5, further comprising:
   a second light source disposed at a same vertical level and on a second side of the first light control layer in the second direction and providing an ultraviolet light to the second photochromic lines.

9. The display device of claim 1, further comprising:
   a second light control layer disposed between the display panel and the first light control layer or between the first light control layer and the window, and including second photochromic lines, the second photochromic lines crossing the first photochromic lines and including the photochromic material.

10. The display device of claim 9, further comprising:
a second light source disposed at a same vertical level and on a side of the second light control layer and providing an ultraviolet light to the second photochromic lines.

11. The display device of claim 1, further comprising:
a first light shield layer disposed on the window or between the first light control layer and the window, and blocking an ultraviolet light.

12. The display device of claim 11, further comprising:
a second light shield layer disposed between the display panel and the first light control layer or under the display panel, and blocking an ultraviolet light.

13. The display device of claim 1, wherein each of the pixels includes an organic light-emitting diode.

14. A display device comprising:
a display panel including pixels arranged along a first direction and a second direction crossing the first direction;
a window disposed on the display panel; and
a first light control layer disposed between the display panel and the window and including first photochromic lines, wherein the first photochromic lines extend in the first direction, are arranged along the second direction, and include a photochromic material,
wherein each of the first photochromic lines has a dashed line shape.

15. An automobile, comprising:
a car body defining an internal space; and
a display device provided in the internal space,
wherein the display device includes:
a display panel including pixels arranged along a first direction and a second direction crossing the first direction;
a window disposed on the display panel;
a light control layer disposed between the display panel and the window and including photochromic lines; and
a first light source disposed at a same vertical level and on a side of the first light control layer and providing an ultraviolet light to the first photochromic lines,
wherein the photochromic lines extend in the first direction, are arranged along and separated from each other in the second direction, and include a photochromic material,
wherein the light control layer includes a transparent base with a plurality of grooves that extend from a top surface of the first light control layer to a level above a bottom surface of the transparent base, wherein each of the photochromic lines is disposed within a corresponding groove of the plurality of grooves, respectively.

16. The automobile of claim 15, further comprising a dashboard in the internal space,
wherein the display device is disposed on the dashboard.

17. The automobile of claim 15, further comprising a head-up display in the internal space,
wherein the display device is included in the head-up display.

18. The automobile of claim 15, further comprising a passenger seat in the internal space,
wherein the display device is disposed in front of the passenger seat.

19. The automobile of claim 15, wherein the photochromic lines are transparent when not receiving an ultraviolet light, and
wherein the photochromic lines are opaque when receiving the ultraviolet light.

* * * * *